United States Patent
Marks et al.

(10) Patent No.: US 11,840,624 B2
(45) Date of Patent: Dec. 12, 2023

(54) METHODS FOR FORMING STEREOSPECIFIC, POLAR FUNCTIONALIZED POLYPROPYLENE

(71) Applicant: Northwestern University, Evanston, IL (US)

(72) Inventors: Tobin J. Marks, Evanston, IL (US); Minglu Huang, Evanston, IL (US); Yanshan Gao, Evanston, IL (US)

(73) Assignee: Northwestern Unversity, Evanston, IL (US)

( * ) Notice: Subject to any disclaimer, the term of this patent is extended or adjusted under 35 U.S.C. 154(b) by 412 days.

(21) Appl. No.: 17/111,682

(22) Filed: Dec. 4, 2020

(65) Prior Publication Data

US 2021/0171753 A1 Jun. 10, 2021

Related U.S. Application Data

(60) Provisional application No. 62/943,384, filed on Dec. 4, 2019.

(51) Int. Cl.
  C08L 23/36 (2006.01)
  C08F 4/76 (2006.01)
  C08F 4/52 (2006.01)

(52) U.S. Cl.
  CPC .............. C08L 23/36 (2013.01); C08F 4/52 (2013.01); C08F 4/76 (2013.01)

(58) Field of Classification Search
  CPC .............. C08L 23/36; C08F 4/76; C08F 4/52
  See application file for complete search history.

(56) References Cited

U.S. PATENT DOCUMENTS

| | | | |
|---|---|---|---|
| 3,293,326 | A | 12/1966 | Jezl et al. |
| 3,476,726 | A | 11/1969 | Giannini |
| 3,755,279 | A | 8/1973 | Langer, Jr. et al. |
| 9,284,390 | B2 | 3/2016 | Nozaki et al. |
| 11,359,039 | B2 | 6/2022 | Marks et al. |
| 2003/0171508 | A1 | 9/2003 | Brookhart et al. |
| 2006/0178491 | A1 | 8/2006 | Canich |
| 2012/0116036 | A1 | 5/2012 | Nozaki et al. |
| 2013/0066029 | A1 | 3/2013 | Radlauer et al. |

OTHER PUBLICATIONS

Shang, Functional Isotactic Polypropylenes via Efficient Direct Copolymerization of Propylene with Various Amino-Functionalized α-Olefins, Macromolecules 52, No. 23 (2019), pp. 9280-9290. (Year: 2019).*

Chen, Jiazhen, et al. "Scandium-Catalyzed Self-Assisted Polar Co-monomer Enchainment in Ethylene Polymerization." *Angewandte Chemie International Edition* 56.50 (2017): 15964-15968.

(Continued)

*Primary Examiner* — Robert D Harlan
(74) *Attorney, Agent, or Firm* — Bell & Manning, LLC

(57) ABSTRACT

Methods for forming polar-functionalized isotactic and syndiotactic polypropylenes are provided, including amino-functionalized polypropylene. In embodiments, such a method comprises contacting a propylene monomer and a polar monomer comprising an amine group in the presence of an organozirconium catalyst and in the absence of a masking reagent, under conditions to induce a polymerization reaction between the propylene and polar monomers, thereby forming polar-functionalized polypropylene.

21 Claims, 6 Drawing Sheets

- Great activity & incorporation
- Masking reagent-free
- Polar monomer-enhanced stereoselection
- Smaller x, higher incorporation

(56) References Cited

OTHER PUBLICATIONS

Radlauer et al., Bimetallic Coordination Insertion Polymerization of Unprotected Polar Monomers: Copolymerization of Amino Olefins and Ethylene by Dinickel Bisphenoxyiminato Catalysts, Journal of the American Chemical Society, Feb. 20, 2013, vol. 135, pp. 3784-3787; p. 3786.

Chen et al., "Metal and Counteranion Nuclearity Effects in Organoscandium-Catalyzed Isoprene Polymerization and Copolymerization," ACS Catalysis, Jul. 6, 2017, vol. 7, pp. 5214-5219.

Kaminsky et al., "Transition Metals and Organometallics as Catalysts for Olefin Polymerization," Springer Science & Business Media, Dec. 6, 2012, pp. 1-442; p. 370.

Bouyahyi, M. et al., "Randomly Functionalized Polyethylenes: In Quest of Avoiding Catalyst Deactivation," *ACS Catal.* 2019, 9, 7779-7790.

Konishi, Y. et al., Nickel-catalyzed propylene/polar monomer copolymerization. *ACS Macro Lett.*, 2018, 7, 213-217.

Wang, C. et al., Heteroatom-assisted olefin polymerization by rare-earth metal catalysts. *Sci. Adv.*, 2017, 3, e1701011.

Ota, Y. et al., Crystalline isotactic polar polypropylene from the palladium-catalyzed copolymerization of propylene and polar monomers. *Angew. Chem. Int. Ed.*, 2016, 55, 7505-7509.

Nakano, R. et al., Copolymerization of propylene and polar monomers using Pd/IzQO catalysts. *J. Am. Chem. Soc.*, 2015, 137, 10934-10937.

Wang, X. et al., Syntheses of well-defined functional isotactic polypropylenes via efficient copolymerization of propylene with ω-halo-α-alkenes by post-metallocene hafnium catalyst. *Macromolecules*, 2014, 47, 552-559.

Wang, X. Y. et al. Insights into propylene/ω-halo-α-alkenes copolymerization promoted by rac-Et(Ind)$_2$ZrCl$_2$ and (pyridylamido) hafnium catalysts. *J. Polym. Sci., Part A: Polym. Chem.*, 2014, 52, 3421-3428.

Zhao, P. et al., Copolymerizations of propylene with functionalized long chain α-olefins using group 4 organometallic catalysts and their membrane application. *J. Polym. Sci., Part A: Polym. Chem.*, 2012, 50, 523-533.

Stehling, U. M. et al., Metallocene/borate-catalyzed copolymerization of 5-N, N-diisopropylamino-1-pentene with 1-hexene or 4-methyl-1-pentene. *Macromolecules*, 1999, 32, 14-20.

Huang, et al. "Polar Isotactic and Syndiotactic Polypropylenes by Organozirconium-Catalyzed Masking-Reagent-Free Propylene and Amino-Olefin Copolymerization." Angewandte Chemie International Edition 59.46 (2020): 20522-20528.

Chen J. et al., "Significant Polar Comonomer Enchainment in Zirconium-Catalyzed, Masking Reagent-Free, Ethylene Copolymerizations." *Angewandte Chemie* 131, No. 21 (2019): 7104-7108.

Shang R. et al., "Functional Isotactic Polypropylenes via Efficient Direct Copolymerizations of Propylene with Various Amino-Functionalized α-Olefins." *Macromolecules* 52, No. 23 (2019): 9280-9290.

\* cited by examiner

FIG. 1A  Late Transition Metal (Ni, Pd) Catalysts
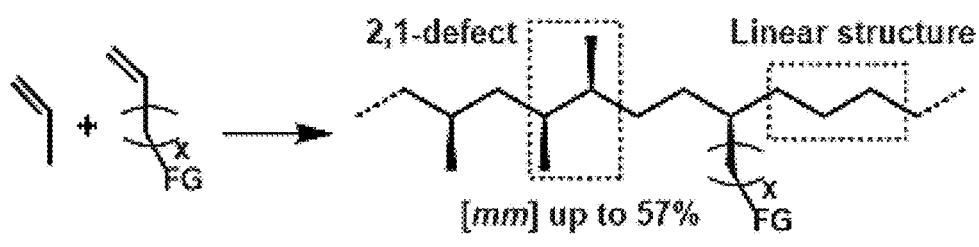
Modest activity, thermal stability  Modest stereo- and regio-control
FIG. 1B  Group 4 Metal Catalysts with Masking Reagent
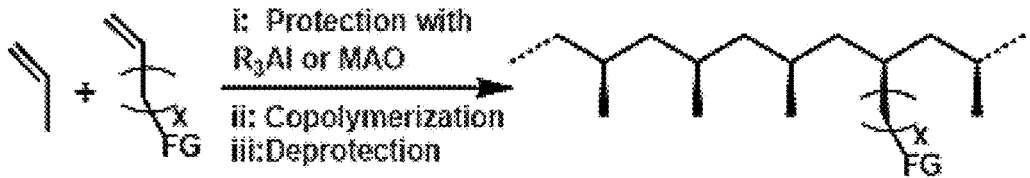

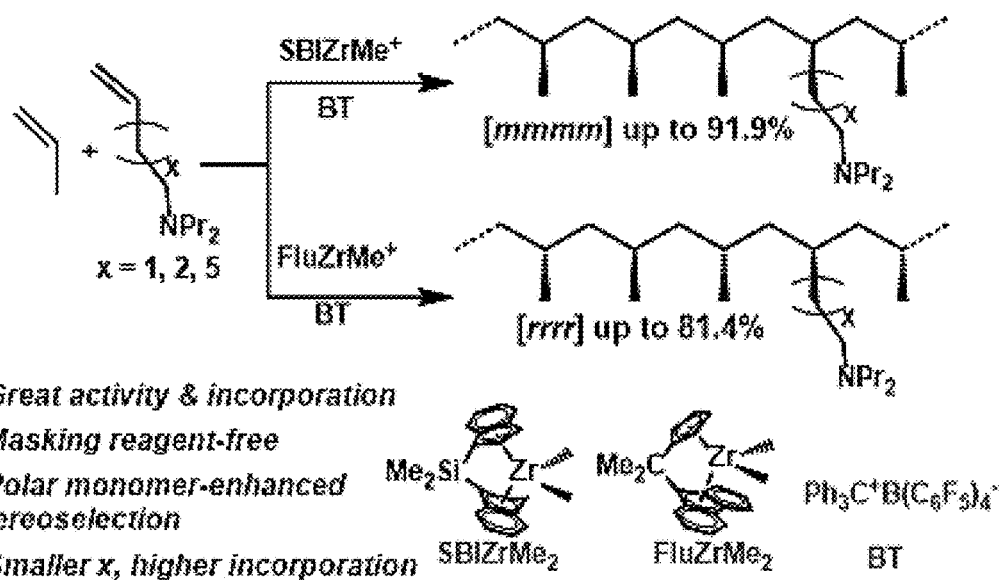
FIG. 1C Group 4 Metal Catalysts w/o Masking Reagent (this work)

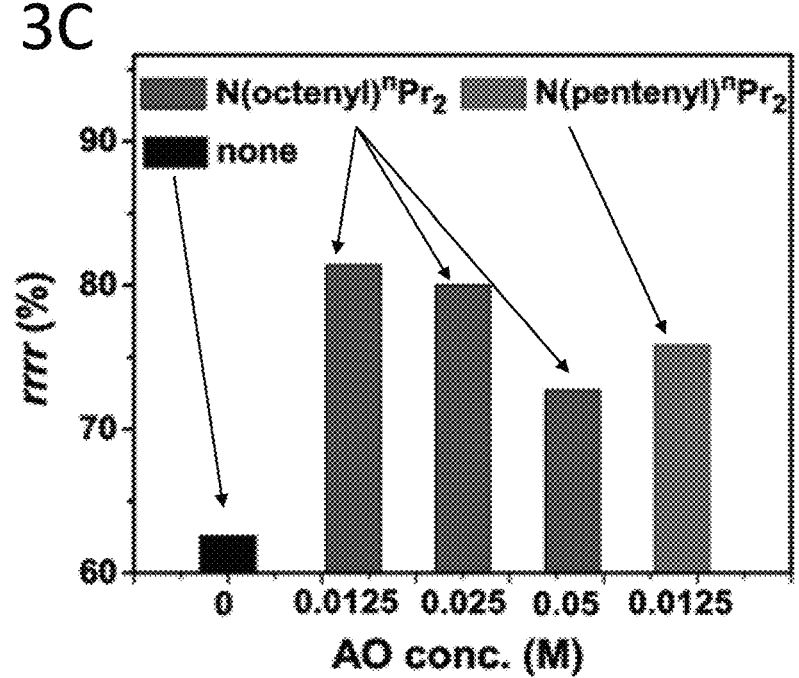

METHODS FOR FORMING STEREOSPECIFIC, POLAR FUNCTIONALIZED POLYPROPYLENE

CROSS-REFERENCE TO RELATED APPLICATIONS

The present application claims the priority benefit of U.S. Provisional Patent App. No. 62/943,384 filed on Dec. 4, 2019, the entire disclosure of which is incorporated by reference herein.

REFERENCE TO GOVERNMENT RIGHTS

This invention was made with government support under CHE1856619 awarded by the National Science Foundation. The government has certain rights in the invention.

BACKGROUND

Polypropylenes (PPs) are among the most widely used polymeric materials, and the ever-growing scope of applications has driven the demand for higher performance PP materials. Introducing polar functional groups into PPs offers an attractive means to enhance surface properties such as adhesion, toughness, conductivity, dyeability, compatibility, rheology, etc., without compromising the parent polyolefin performance characteristics. Such significantly modified/enhanced performance properties could greatly expand the range of PP applications. For the synthesis of functionalized polyolefins, post-polymerization functionalization has long been used to derivatize commercial PPs. However, such processes often require harsh conditions, lack selectivity, and cause side reactions such as chain scission and cross-linking.

SUMMARY

Provided are methods for forming polar-functionalized polypropylenes, including amino-functionalized polypropylenes. In embodiments, such a method comprises contacting a propylene monomer and a polar monomer comprising an amine group in the presence of an organozirconium catalyst and in the absence of a masking reagent, under conditions to induce a polymerization reaction between the propylene and polar monomers, thereby forming polar-functionalized polypropylene.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIGS. 1A-1C relate to functionalized isotactic and syndiotactic polypropylene synthesis via: (FIG. 1A) late transition metal (Pd, Ni) catalysts; (FIG. 1B) group 4 metal catalysts with masking reagents; (FIG. 1C) group 4 metal-catalyzed direct copolymerization without masking reagent (the present disclosure).

FIGS. 3A-3C show results for FluZrMe$_2$-catalyzed isotactic propylene copolymerization with the indicated amino-olefin (AO): Effects of N(octenyl)$^n$Pr$_2$ concentration (FIG. 3A) and AO linker length (FIG. 3B) on activity and AO incorporation. Effects of AO concentration and linker length on polypropylene pentad syndiotacticity (FIG. 3C).

DETAILED DESCRIPTION

Figure 2A:
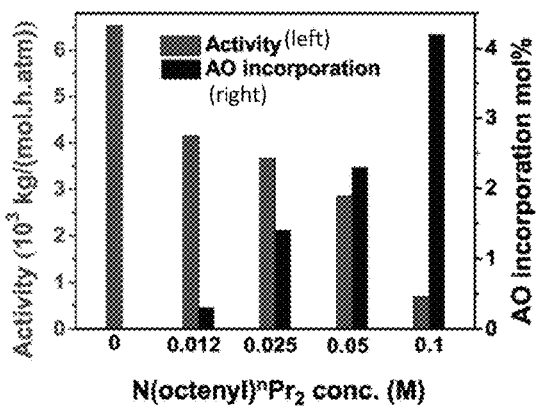
FIGS. 2A-2C show results for SBIZrMe$^+$-catalyzed isotactic propylene copolymerizations with the indicated amino-olefins (AOs). Effects of N(octenyl)$^n$Pr$_2$ concentration (FIG. 2A) and AO linker length (FIG. 2B) on activity and AO incorporation. Effects of AO concentration and linker length on polypropylene pentad isotacticity (FIG. 2C).

Provided are methods for forming polar-functionalized polypropylenes, including amino-functionalized polypropylenes.

Direct alkene/polar comonomer coordinative polymerization is a desirable approach to functionalizing polyolefins. Most polar monomer copolymerization studies have focused on ethylene, and propylene has received far less attention. Note that d$^8$ metal (Ni, Pd) catalysts exhibit significant heteroatom tolerance and have been investigated for propylene+polar monomer copolymerizations (FIG. 1A). However, these catalysts have modest activity and thermal stability, with regio- and stereo-control compromised by a competing "chain walking" process which adds undesirable chain branching groups. While d$^0$ group 4 catalysts are efficient in olefin polymerizations, they are typically poisoned by polar comonomers, and stoichiometrically excess Lewis acidic "masking reagents" are used to bind the polar group and suppress poisoning. However, the masking reagents and their removal from the product increase cost, erode atom economy, and complicate rigorous mechanistic analysis (FIG. 1B). Other group 4 metal catalysts are active for polar monomer homopolymerizations and 1-hexene/polar monomer copolymerizations, although the product stereochemistry and stereopurity is less well-defined, and the polar monomer heteroatom role is not well understood.

The present disclosure relates to organo-Zr catalyzed masking reagent-free direct amino-propylene copolymerization for the syntheses of both isotactic and syndiotactic functionalized PPs with substantial activity, comonomer incorporation, and comonomer-influenced stereoselection (FIG. 1C). The synthesis of polar functionalized polypropylenes has not previously been accomplished with any significant, commercially relevant efficiency. Moreover, the demonstrated enhancement in stereoselection afforded by the present methods is an unexpected advantage. That this enhancement is achieved even in the absence of any masking reagents is an additional advantage since such reagents need to be removed from reaction mixtures, erode atom economy, and increase production cost.

The present methods involve the use of organozirconium catalysts in the copolymerization of unfunctionalized propylene monomers with functionalized polar monomers. The functionalized polar monomers are functionalized with a polar functional group, e.g., an amino group, and thus, may be referred to as "polar monomers". The unfunctionalized propylene monomers are free of functional groups and may be referred to as "propylene monomers." At least some embodiments of the present methods are able to provide polar-functionalized polypropylenes having high levels of functionalization (i.e., polar monomer incorporation) as well as enhanced isotacticity/syndiotacticity (depending upon the catalyst) as compared to the same methods but without using the polar monomers (i.e., as compared to homopolymerization).

In an embodiment, a method for forming a polar-functionalized polypropylene comprises contacting a propylene monomer and a polar monomer in the presence of an organozirconium catalyst under conditions to induce a polymerization reaction between the propylene and polar monomers.

The polar monomer provides the polar functional groups in the resulting polypropylene to be formed using the present methods. The polar functional group may be an amine group —$NR_2$, wherein "—" denotes the covalent bond to the rest of the polar monomer. In embodiments, each R is an independently selected unsubstituted aryl group or an unsubstituted linear alkyl group or an unsubstituted branched alkyl group having, e.g., from 1 to 10 carbons (including 2, 3, 4, 5, 6, 7, 8, and 9). The term "unsubstituted" in an unsubstituted group/molecule means containing no heteroatoms (e.g., oxygen, nitrogen, a halogen atom). The two R groups may be the same group (e.g., same alkyl group) or different groups (e.g., different alkyl groups). The amine group may be covalently bound via a linker group, e.g., an unsubstituted linear alkyl chain having, e.g., from 1 to 11 carbons (including 2, 3, 4, 5, 6, 7, 8, 9, and 10). The polar monomer may have the Formula $H_2C=CH(CH_2)_nNR_2$, wherein each R is defined as immediately above and n is an integer from 1 to 11 (including 2, 3, 4, 5, 6, 7, 8, 9, and 10). Illustrative amino-propylene monomers include those used in the Example below. Combinations of different types of amino-propylene comonomers may be used in the method.

The polymerization reactions between the propylene and the polar monomers are mediated by group 4 organometallic catalysts, organometallic complexes comprising a titanium or zirconium or hafnium center. However, in embodiments, the center is zirconium. Illustrative group 4 organometallic catalysts include those shown in FIG. 1C and described in the Example below. Combinations of different types of organozirconium catalysts may be used in the method.

The polymerization reactions are generally carried out in the presence of a cocatalyst. Cocatalysts include boranes ($BR'_3$) and borates ($[R_3C]^+[BR'_4]^-$, $[R''_3NH]^+[BR'_4]^-$), wherein R, R', R" are independently selected from alkyl and aryl groups. The R, R', and R" groups may be different. In embodiments, R and R' are each a fluorinated aryl group, for example, a pentafluorophenyl group. An illustrative cocatalyst is shown in FIG. 1C and described in the Example below. At least in some embodiments, the polymerization reactions are carried out in the absence of a Lewis acid masking reagent, e.g., methylaluminoxane or an aluminum alkyl (e.g., $AlBu^t_3$). The resulting reaction mixtures comprising the polar-functionalized polypropylenes are free from such Lewis acid masking reagents. Similarly, the polymerization reactions are generally carried out in the absence of water and oxygen (i.e., under anhydrous/anaerobic conditions).

Various reactor systems may be used to carry out the present methods, e.g., batch reactors or continuous reactors. The components used in the method may be provided in various media, e.g., liquid media. By way of illustration, the polar monomer may be provided as a solution comprising a solvent, e.g., a hydrocarbon solvent. The organozirconium catalyst/cocatalyst may be similarly provided as a solution. Gaseous propylene may be provided as a pure gas.

The conditions which induce polymerization reactions between the propylene and polar monomers include the relative concentration of components, the pressure, the reaction temperature, the reaction time, the liquid media used, and the catalyst/cocatalyst used. The catalyst concentration may be in the range of 0.000001 M to 2.0 M. The cocatalyst concentration may be in the range of 0.000001 M to 200 M. The pressure for gaseous propylene may be in the range of 0.001 atm to 1000 atm. The polar monomer concentration may be in the range of 0.0001 M to solvent-free. The reaction temperature may be in the range of −40 to 160° C. The polymerization reactions may be carried out in organic solvents. The organic solvent employed can be an aliphatic alkane or cycloalkane such as pentane, hexane, heptane, cyclohexane or methylcyclohexane; or a hydrogenated aromatic compound, such as tetrahydronaphthalene or decahydronaphthalene; or a high molecular weight liquid paraffin or mixture of paraffins which are liquid at the reaction temperature; or an aromatic hydrocarbon, such as benzene, toluene, xylene; or halogenated solvents such as fluorobenzene, difluorobenzene or chlorobenzene.

The parameters described above (including the type of polar monomer used) may be adjusted to tune the properties of the copolymer (the polar-functionalized polypropylene). This includes adjustment to achieve a particular (e.g., maximum) yield or activity as well as a particular amount of polar monomer incorporation. Similarly, these parameters may be adjusted to achieve a desired amount (e.g., maximum) of a specific tacticity (e.g., pentad isotacticity (mmmm) or pentad syndiotacticity (rrrr)). These parameters may be adjusted to tune other properties such as the melting temperature $T_m$ and the water contact angle of the polar-functionalized polypropylene. Illustrative parameters and techniques for determining each of these properties are provided in the Example below.

The present methods may further comprise recovering the polar-functionalized polypropylenes. As noted above, since no masking reagents are needed, recovery is more simple, efficient, and effective as compared to methods requiring the use of such masking reagents.

The polar-functionalized polypropylenes themselves are also encompassed by the present disclosure. The polar-functionalized polypropylene is a copolymer of propylene and any of the described polar monomers. The polar-functionalized polypropylenes may be characterized by any of the properties described above. By way of illustration, the polar-functionalized polypropylene may be characterized by one or more of the following: polar monomer incorporation in the range of from 0.01% to 12.5% (this includes a range of from 1% to 10%, 2% to 8%, 2% to 6%, and 3% to 5%); and tacticity (e.g., pentad isotacticity mmmm or pentad syndiotacticity rrrr) in the range of from 65% to 100% (this includes a range of from 70% to 100%, from 70% to 90%, from 70% to 85%, from 70% to 80%, from 75% to 90%, from 75% to 85%, from 80% to 95%, and from 80% to 90%). Regarding tacticity, it is noted that these values are significantly greater (e.g., at least an additional 10%, 20%, 25%, or 30%) than the same method but without the use of the polar monomer (i.e., the method involves only the propylene monomer, i.e., homopolymerization). Such enhancements are unprecedented and unexpected, particularly in the absence of masking reagents. The polar-functionalized polypropylene may also be characterized by a melting temperature, e.g., $T_m$ in the range of from about 50° C. to about 160° C. The $T_m$s may be comparable to commercial isotactic/syndiotactic polypropylene, thereby ensuring that performance is maintained. The polar-functionalized polypropylene may also be characterized by an advancing aqueous contact angle, e.g., in the range of from 80° to 110°. These values are relatively low, thereby ensuring compatibility with other polar materials.

The method may be characterized by a yield in the range of from about 0.1 g to about 10 g (this includes a range of from about 1 g to about 10 g and from about 5 g to about 10 g), an activity in the range of from about 100 to about 10,000 kg copolymer/mol·Zr·h·atm (this includes a range of from about 250 to about 8,000 kg copolymer/mol·Zr·h·atm and from about 500 to about 6,000 kg copolymer/mol·Zr·h·atm) or both.

The values of polar monomer incorporation, tacticity, yield, and activity above may refer to a particular set of conditions, e.g., those disclosed in the Example below (see Tables 1 and 2).

Further regarding the substantial activity along with high levels of comonomer incorporation and enhanced stereoselection afforded by the present methods which do not make use of a masking reagent, it is noted that experiments described in Shang, R. et al., *Macromolecules* 2019, 52, 23, 9280-9290 were repeated using the catalyst system (pyridylamido)Hf/[Ph$_3$C][B(C$_6$F$_5$)$_4$] both with, and without the masking reagent, AlBu$^i_3$. No activity was observed in the absence of the masking reagent, further highlighting the unexpected advantages afforded by the present methods.

The polar-functionalized polypropylenes may be used as is or may be combined with other components to form a composition (e.g., other polymers including unfunctionalized polypropylene) in order to tune the properties of the composition. The polar-functionalized polypropylenes have use in adhesive, hydrophilic, antibacterial or antiviral materials as well as in other polypropylene compounding applications.

Example

INTRODUCTION

In this Example, polar functionalized isotactic and syndiotactic polypropylenes (PPs) were synthesized by direct propylene+amino-olefin (AO, CH$_2$=CH(CH$_2$)$_x$N$^n$Pr$_2$, x=2, 3, 6) copolymerization using the precatalysts rac-[Me$_2$Si-(indenyl)$_2$]ZrMe$_2$ (SBIZrMe$_2$) and [Me$_2$C(Cp)-(fluorenyl)]ZrMe$_2$ (FluZrMe$_2$), respectively. Activities were up to 4027 and 313 kg/(mol·h·atm), with AO incorporation up to 3.2 mol % and 1.9 mol %, respectively. Remarkably, introducing amino-olefin comonomers enhanced stereoselection for both isotactic (mmmm: 59.5% to 91.9%) and syndiotactic (rrrr: 63.3% to 81.0%) products.

Materials and Methods

All manipulations of air-sensitive materials were performed with rigorous exclusion of O$_2$ and moisture in oven-dried Schlenk-type glassware on a dual manifold Schlenk line, interfaced to a high-vacuum line (10$^{-6}$ Torr), or in a N$_2$-filled MBraun glove box with a high-capacity recirculator (<1 ppm O$_2$). Argon (Airgas, pre-purified grade) was purified by passage through a supported MnO oxygen-removal column and an activated Davison 4 Å molecular sieve column. Propylene (Airgas) was purified by passage through an oxygen/moisture trap (Matheson, model MTRP-0042-XX). Hydrocarbon solvents (n-pentane) were dried using activated alumina columns according to the method described by Grubbs and were additionally vacuum-transferred from Na/K alloy immediately before vacuum line manipulations. (Pangborn, A. B. et al., *Organometallics* 1996, 15 (5), 1518-20.) All solvents for high-vacuum line manipulations were stored in vacuum over Na/K alloy in Teflon-valve sealed bulbs. All other deuterated solvents were used as received (Cambridge Isotope Laboratories, 99+ atom % D). Other non-halogenated solvents were dried over Na/K alloy, and halogenated solvents were distilled from CaH$_2$ and stored over activated Davison 4 Å molecular sieves. All reagents other than specified are commercially available and used as received. Amino olefins were synthesized and purified according to known methods. SBIZrMe$_2$ and FluZrMe$_2$ were synthesized as described in Beck, S. et al., *J. Am. Chem. Soc.* 2001, 123 (7), 1483-1489; and Razavi, A. et al., *Journal of organometallic chemistry* 1992, 435 (3), 299-310.

Physical and Analytical Measurements

NMR spectra were recorded on Varian UNITY Inova-500 (FT, 500 MHz, $^1$H; 125 MHz, $^{13}$C), UNITY Inova-400 (FT, 400 MHz, $^1$H; 100 MHz, $^{13}$C), Agilent DD2-HCN600 (FT, 600 MHz, $^1$H; 150 MHz, $^{13}$C). Chemical shifts for $^1$H and $^{13}$C spectra were referenced using internal solvent resonances and are reported relative to tetramethylsilane (TMS). NMR experiments on air-sensitive samples were conducted in Teflon valve-sealed sample tubes (J-Young). $^1$H NMR and $^{13}$C NMR analysis of polymer microstructure were conducted in 1,1,2,2-tetrachloroethane-d$_2$ at 120° C. with delay time (d$_1$)=5 or 10 seconds. DSC measurements were performed on SDT Q600 at a rate of 10° C./min. Any thermal history differences in the polymers were eliminated by first heating the specimen at 10° C./min to 230° C., cooling at 10° C./min to 30° C., and then recording the second DSC scan.[31] Samples for water contact angle measurements were prepared by the evaporation of 1 mg mL$^{-1}$ solution in 1,2,4-trichlorobenzene onto silicon substrates under 170° C. Aqueous advancing contact angles on polymer films were measured by VCA Optima Contact Angle Measurement system (AST Products, Inc.). For each film, at least six measurements were made, and the water contact angles of the polymer thin films have an accuracy of ±2°.

General Propylene+AO Copoymerization Procedure

In a typical experiment, a 150 mL glass pressure vessel equipped with magnetic stir bar (dried in an oven overnight prior to use) was loaded with 10 mL of toluene and the AO (and/or with N$^n$Pr$_3$ when stated), taken out of the glovebox and attached to a high vacuum line. The mixture was cooled to −78° C. in a dry ice/acetone bath and degassed, then allowed to warm up to 25° C. with an external water bath. The mixture was then magnetically stirred rapidly under 1 atm of propylene, and 10 mL of catalyst/cocatalyst solution was quickly injected into the rapidly stirred flask using a gas-tight syringe equipped with a flattened spraying needle. After a measured time interval, the reaction was stopped by introducing 10 mL of methanol; the reactor was then vented and additional methanol was added to the polymerization mixture to precipitate polymer. The precipitated polymer was stirred for several hours, filtered, washed with methanol, and collected. It was then dried under high vacuum at 60° C. overnight until reaching a constant weight.

Amino-Olefin (AO) Incorporation Level in Poly(propylene-co-AO) Analysis $^1$H NMR spectra were collected as used to determine the level of incorporation of the amino-functionalized propylene. Peaks at δ 2.95 ppm-3.05 ppm which appear in all the $^1$H NMR spectra of the copolymers are ascribed to the NCH$_2$ group, indicating an aminoalkyl group is successfully introduced onto the PP backbone. The AO incorporation in poly(propylene-co-AO) can be estimated from $^1$H NMR spectra using the following equation:

$$AO\ \text{incoporation} = \frac{\text{area of } \sum \text{NCH}_2}{\left[\sum \text{CH area} + \sum \text{CH}_2 \text{ area} + \sum \text{CH}_3 \text{ area} - (11+2n) \times \frac{\text{area of } \sum \text{NCH}_2}{6}\right] + \text{area of } \sum \text{NCH}_2}$$

$n = 2, 3, 6$ $\sum NCH_2$ area $= I_{H4}(2.96$ ppm $- 3.05$ ppm$)$ $\sum CH$ area $= I_{H3}(1.65$ ppm $- 1.75$ ppm$)$ $\sum CH_2$ area $= I_{H2}(1.27$ ppm $- 1.42$ ppm$)$ $\sum CH_3$ area $= I_{H1}(0.93$ ppm $- 1.08$ ppm$)$ All the AO incorporation data is summarized in Tables 1 and 2, below.

Isolacticity Analysis for Polypropylene and Propylene+ AO Copolymers

The pentad mmmm of isotactic polypropylene and poly(propylene-co-AO) samples from Table 1 below were calculated based on $^{13}$C NMR using the equation shown below:

$$[mmmm] = \frac{\text{area of } mmmm}{\sum CH_3 \text{ area}}$$

Syndiolacticily Analysis for Polypropylene and Propylene+AO Copolymers

The pentad rrrr of syndiotactic polypropylene and poly(propylene-co-AO) samples from Table 2 below were calculated based on $^{13}$C NMR using the equation shown below:

$$[rrrr] = \frac{\text{area of } rrrr}{\sum CH_3 \text{ area}}$$

Number Average Molecular Weight ($M_n$) Calculation of Polypropylene and Poly(propylene-co-AO)

Vinylidene (4.80-4.95 ppm), vinylene (cis and trans, 5.38-5.56 ppm) and isobutenyl (iBut: 5.00-5.20 ppm) were observed in the samples in this Example, suggesting β-H elimination as the chain termination pathway. The polymer chains with different end-groups are shown below:

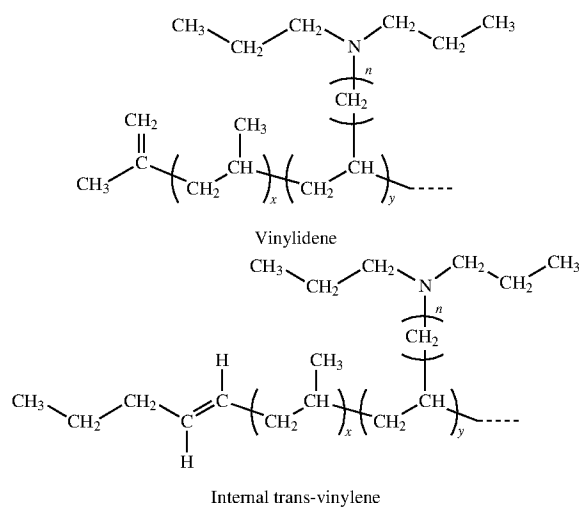

Internal trans-vinylene

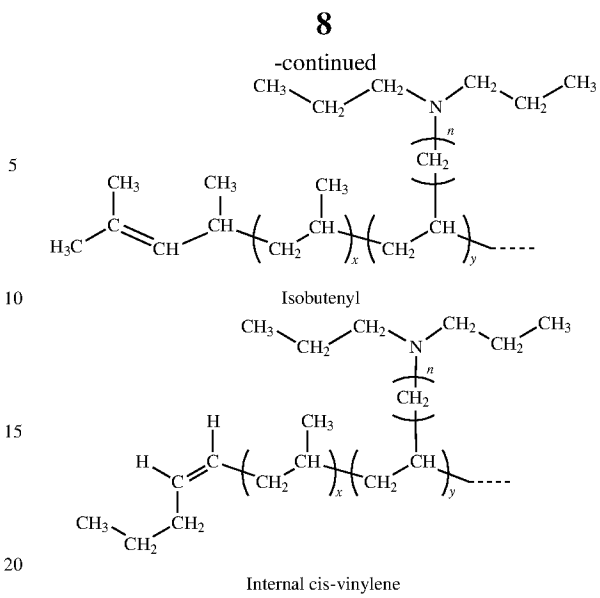

Internal cis-vinylene

The above structures are intended to illustrate the composition of the monomers, instead of the actual microstructural sequence.

$M_{n,NMR}$ of poly(propylene-co-AO) and PP samples are estimated based on $^1$H NMR spectra using the following eqs.:

$$M_n = M_{unsaturated\ unit} + x \cdot M_{propylene} + y \cdot M_{AO}$$

$$x \approx \frac{\sum CH\ area + \sum CH_2\ area + \sum CH_3\ area - \frac{2n+11}{6}\sum NCH_2\ area}{6 \times \left(\frac{\sum CH_2\ vinylidene\ area + \sum CH_{vinylene}\ area}{2} + \sum CH_{iBut}\ area\right)}$$

$$y \approx \frac{\sum NCH_2\ area}{6 \times \left(\frac{\sum CH_2\ vinylidene\ area + \sum CH_{vinylene}\ area}{2} + \sum CH_{iBut}\ area\right)}$$

The $M_{saturated\ unit}$ is approximated as 42 g/mol.

$\sum CH_2\ vinylidene$ area $= I_H(4.80\ ppm - 4.95\ ppm)$ $\sum CH_2\ vinylene$ area $= I_H(5.38\ ppm - 5.56\ ppm)$ $\sum CH$ area $= I_{H3}(1.65\ ppm - 1.75\ ppm)$ $\sum CH_2$ area $= I_{H2}(1.27\ ppm - 1.42\ ppm)$ All the $M_{n,NMR}$ data are summarized in Tables 1 and Table 2.

Results and Discussion

Polymerizations were carried out at 25° C. under constant 1.0 atm propylene pressure and rigorously anhydrous+anaerobic conditions with attention to exotherm and mass transfer effects. Precatalysts rac-[Me$_2$Si(indenyl)$_2$]ZrMe$_2$ (SBIZrMe$_2$) and [Me$_2$C(Cp)-(fluorenyl)]ZrMe$_2$ (FluZrMe$_2$), were activated with Ph$_3$C$^+$B(C$_6$F$_5$)$_4^-$(BT) for isotactic (Table 1) and syndiotactic (Table 2) propylene+amino-olefin (AO) copolymerizations, respectively. The copolymer polar monomer contents were analyzed by $^1$H NMR, with tacticity and defect content analyzed by established $^{13}$C NMR techniques. Products were repeatedly washed with MeOH to remove the unreacted AO polar co-monomer, confirmed by the absence of its characteristic $^1$H NMR vinyl olefinic signals. The GPC of the copolymer samples was uninformative, reflecting known amine functionality artifacts in ethylene+AO copolymer GPC analyses.

tion effects. These polar monomer effects on stereocontrol contrast to the catalyst systems using masking reagents which exhibit essentially no change in mmmm.

By varying the AO linker length (x, FIG. 1C), distinctive x-dependent selectivity and activity patterns are observed

TABLE 1

Isotactic PP Properties from SBIZrMe$_2$ + BT catalyzed propylene + amino-olefin copolymerization.[a]

| entry | comonomer | conc., M | t, min | yield, g | act.[b] | inc., mol %[c] | [mmmm], %[d] | $M_n$, NMR[e] ×10$^4$ | $T_m$, °C[f] | contact angle, %[g] |
|---|---|---|---|---|---|---|---|---|---|---|
| 1 | None | — | 4.0 | 4.36 | 6535 | — | 59.5 | 2.0 | 139.0 | 108 |
| 2 | N(octenyl)$^n$Pr$_2$ | 0.012 | 4.0 | 2.69 | 4027 | 0.7 | 83.8 | 4.6 | 135.2 | 106 |
| 3 | N(octenyl)$^n$Pr$_2$ | 0.025 | 2.0 | 1.28 | 3832 | 1.4 | 87.4 | 3.5 | 141.8 | 106 |
| 4 | N(octenyl)$^n$Pr$_2$ | 0.05 | 2.0 | 0.77 | 2297 | 2.2 | 85.4 | 3.6 | 121.4 | 100 |
| 5 | N(octenyl)$^n$Pr$_2$ | 0.1 | 2.0 | 0.17 | 520 | 3.2 | 81.3 | 5.4 | n.d. | — |
| 6 | N(octenyl)$^n$Pr$_2$ | 0.2 | 20.0 | Trace | — | — | — | — | — | — |
| 7 | N(pentenyl)$^n$Pr$_2$ | 0.012 | 20.0 | 0.08 | 25 | 0.5 | 90.4 | 9.9 | 140.9 | 106 |
| 8 | N(butenyl)$^n$Pr$_2$ | 0.012 | 20.0 | 0.03 | 9 | 0.5 | 91.9 | 3.0 | 141.9 | 104 |

[a]Conditions: 10 μmol SBIZrMe$_2$, 10 μmol BT, 1 atm propylene, 20 mL toluene, 25° C., average of 2 runs for each entry. Each entry performed in duplicate.
[b]kg/(mol · h · atm).
[c]Incorporation, mol % by $^1$H NMR.
[d]By $^{13}$C NMR and analyzed as described herein.
[e]By $^1$H NMR as described herein.
[f]By DSC.
[g]At least 6 measurements for each sample, error range ±2°.

TABLE 2

Syndiotactic PP properties from FluZrMe$_2$ + BT catalyzed propylene + amino-olefin copolymerizations.[a]

| entry | comonomer | conc., M | t, min | yield, g | act.[b] | inc. mol %[c] | [rrrr], %[d] | $M_n$, NMR[e] ×10$^4$ | $T_m$, °C[f] | contact angle, %[g] |
|---|---|---|---|---|---|---|---|---|---|---|
| 1 | None | — | 2.0 | 1.76 | 5284 | 0 | 66.3 | 8.0 | 103.9 | 108 |
| 2 | N(octenyl)$^n$Pr$_2$ | 0.012 | 10.0 | 0.52 | 313 | 0.8 | 81.0 | 7.4 | 125.8 | 104 |
| 3 | N(octenyl)$^n$Pr$_2$ | 0.025 | 25.0 | 0.20 | 48 | 1.6 | 79.0 | 5.6 | 117.3 | 103 |
| 4 | N(octenyl)$^n$Pr$_2$ | 0.05 | 25.0 | 0.06 | 15 | 1.9 | 78.9 | 7.2 | 111.4 | 104 |
| 5 | N(octenyl)$^n$Pr$_2$ | 0.1 | 25.0 | Trace | — | — | — | — | — | — |
| 6 | N(pentenyl)$^n$Pr$_2$ | 0.012 | 25.0 | 0.06 | 14 | 1.0 | 80.8 | 2.7 | 119.7 | 104 |
| 7 | N(butenyl)$^n$Pr$_2$ | 0.012 | 25.0 | 0.01 | 1 | 1.5 | — | n.d. | — | 107 |

[a]Conditions: 10 μmol FluZrMe$_2$, 10 μmol BT, 1 atm propylene, 20 mL toluene, 25° C., average of 2 runs for each entry. Each entry performed in duplicate.
[b]units of kg/(mol · h · atm).
[c]Incorporation, mol %, by $^1$H NMR.
[d]By $^{13}$C NMR and analyzed as described herein.
[e]By $^1$H NMR as described herein.
[f]By DSC.
[g]At least 6 measurements for each sample, error range ±2°.

Figure 2B:
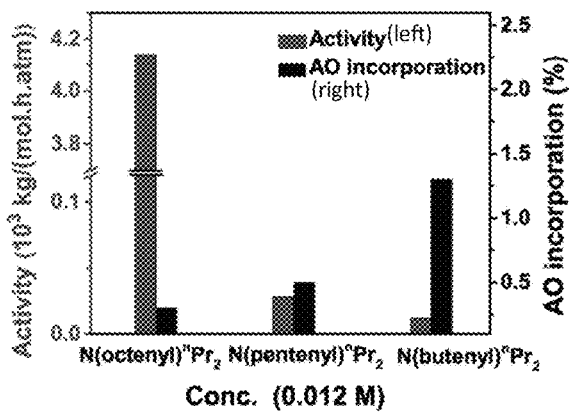

Using SBIZrMe$_2$+BT for isotactic propylene copolymerization affords poly(propylene-co-AO) with high activity, significant AO incorporation, and surprisingly enhanced isotacticity (Table 1). For example, compared to propylene homopolymerization, propylene/-N(octenyl)$^n$Pr$_2$ copolymerization ([AO]=0.012 M) activity falls slightly from 6535 to 4027 kg/(mol·h·atm) with 0.7 mol % comonomer incorporation; unexpectedly, the product pentad isotacticity mmmm increases from 59.5% to 83.8% (Table 1, entry 1 vs. 2). Furthermore, N(octenyl)$^n$Pr$_2$ concentration effects are substantial (FIG. 2A). Increasing [AO] from 0.012 M to 0.10 M dramatically increases the comonomer content from 0.7 mol % to 3.2 mol % with a 7.7× decline in activity. Simultaneously, the product mmmm slightly changes from 83.8% to 81.3% (Table 1, entry 2 vs. 5). Note however when [N(octenyl)$^n$Pr$_2$] reaches 0.2 M, only trace copolymer is obtained (Table 1, entry 6), suggesting significant deactiva- (FIG. 2B). Contracting the linker from N(octenyl)$^n$Pr$_2$→N(pentenyl)$^n$Pr$_2$→N(butenyl)$^n$Pr$_2$ while keeping the [AO] at 0.012 M leads to essentially no change in AO incorporation, from 0.7 mol % to 0.5 mol % and 0.5 mol %, while significantly depressing the activity, from 4027→25→9 kg/(mol·h·atm), respectively (Table 1, entry 2 vs. 7 and 8), and mmmm increases from 83.8% to 90.4% and 91.9%. Such comonomer and linker length-stereoregulation effects are unprecedented.

Figure 2C:
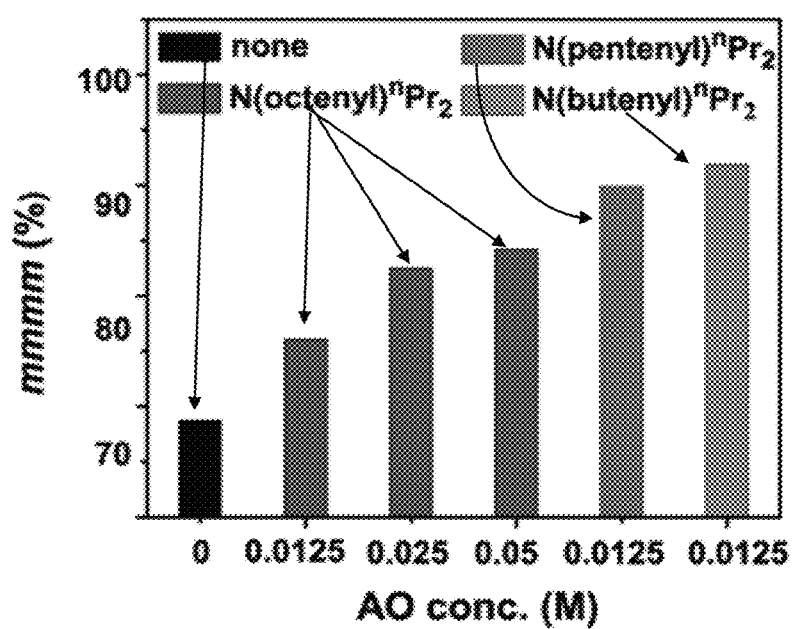
Figure 3A:
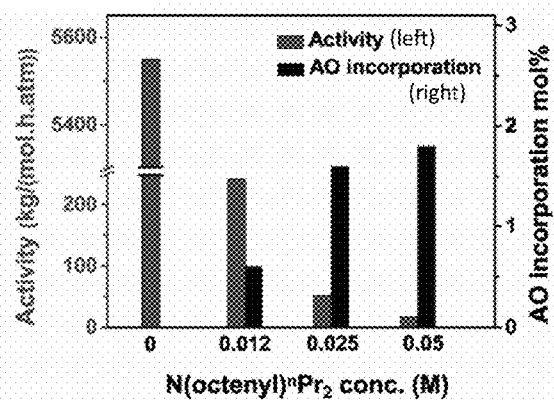
Figure 3B:
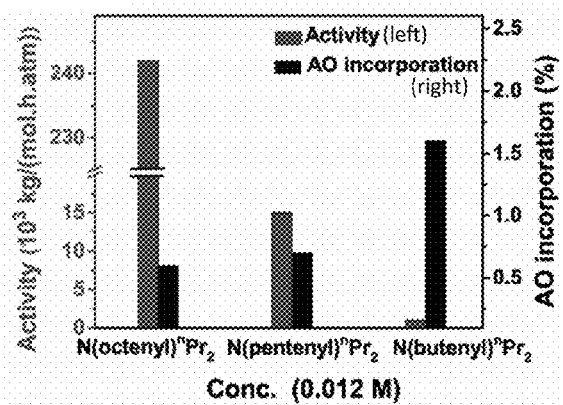

FluZrMe$_2$+BT mediated propylene copolymerizations afford poly(propylene-co-AO) products with good polar comonomer incorporation and substantial syndiotacticity albeit with reduced activity (Table 2). Compared with propylene homopolymerization, propylene+N(octenyl)$^n$Pr$_2$ copolymerization ([AO]=0.012 M) exhibits 16.9× reduced activity with 0.8 mol % comonomer incorporation; unexpectedly and similar to the above isotactic catalytic system, the product pentad syndiotacticity rrrr increases from 66.3% to 81.0% (Table 2, entry 1 vs. 2). Significant [N(octenyl)''Pr$_2$] effects are also observed (FIG. 3A); increasing [AO] from 0.012 M to 0.05 M effects a 2.4× increase in comonomer incorporation (0.8 mol %→1.9 mol %) with a 20.9× fall in activity. In contrast to the above SBIZrMe$^+$-catalyzed isotactic polymerizations (FIG. 2C), rrrr declines here from 81.0%→78.9% (Table 1, entry 2 vs. 5; FIG. 3C), still exceeding that for propylene homopolymerization (Table 2, entry 1). Note that when [N(octenyl)''Pr$_2$] reaches 0.1 M, only trace polymer is obtained (Table 1, entry 5), suggesting greater deactivation effects than in the isospecific system.

Contracting the AO linker length from N(octenyl)''Pr$_2$→N(pentenyl)''Pr$_2$→N(butenyl)''Pr$_2$ with [AO] at 0.012 M leads to slight changed AO incorporation, from 0.8 mol %→1.0 mol %→1.5 mol %, while significantly depressing activity, from 313→14→1 kg/(mol·h·atm), respectively (Table 2, entry 2 vs. 6 and 7). Contrary to the isoselective trends (FIG. 2C), the corresponding rrrr decreases slightly from 81.0% to 80.8% for copolymerization with N(octenyl)''Pr$_2$ and N(pentenyl)-''Pr$_2$, respectively. Note that propylene/N(butenyl)''Pr$_2$ copolymerizations (Table 2, entry 7) do not yield sufficient polymer for $^{13}$C NMR analysis. The larger activity drop suggests FuZrMe$^+$ is more susceptible to deactivation than SBIZrMe$^+$ in propylene+AO copolymerizations.

Terminal unsaturations, such as vinylidene and allyl end groups, have been reported for metallocene-catalyzed propylene homopolymerization due to β-hydride and β-methyl transfer, respectively. All PP and poly(propylene-co-AO) samples from this Example were evaluated by $^1$H NMR spectroscopy. As noted above, vinylidene (δ 4.80-4.95 ppm), vinylene (cis and trans, δ 5.38-5.56 ppm) and isobutenyl (iBut: δ 5.00-5.20 ppm) were observed in the samples, suggesting β-H elimination as the chain termination pathway. The $M_{n,NMR}$ of PP obtained by SBIZrMe$_2$+BT and FluZrMe$_2$+BT are 2.0×10$^4$ g/mol and 8.0×10$^4$ g/mol, respectively, consistent with the collected GPC data (1.7×10$^4$ g/mol and 3.9×10$^4$ g/mol, respectively), suggesting NMR as a reliable method for $M_n$ calculation in this Example. Note that GPC data obtained for the polar PP samples are uninformative, reflecting known amine functionality artifacts in ethylene+AO copolymers. While the $M_{n,NMR}$ of the isotactic polar PP is slightly higher than that of the isotactic homopolymer PP, the $M_{n,NMR}$ of the syndiotactic polar PP is similar to or slightly lower than that of the syndiotactic homopolymer PP, both suggesting the formation of high $M_n$ polymer.

All samples were investigated by advancing aqueous contact angle and melting point ($T_m$) measurements to assess the effects of the introduced polar comonomers. After incorporating AO into the PPs, the advancing aqueous contact angle falls by as much as 8° and 5° for isotactic and syndiotactic PP samples, respectively, reflecting an altered PP surface energy. The DSC curves of all polymer samples show only a single $T_m$. Isotactic PP and polar PP samples from Table 1 exhibit similarly high $T_m$. As for syndiotactic PP and polar PP samples from Table 2, polar PPs exhibit higher $T_m$ than PP, likely reflecting the enhanced syndiotacticity. Thus, the introduction of AO monomers effectively enhances the hydrophilicity of the PP without suppressing the parent PP's melting point.

CONCLUSIONS

These results present new and efficient d$^0$ group 4 catalyst-mediated direct isotactic and syndiotactic PP+AO copolymerization systems, which exhibit several intriguing trends: i. Significant amounts of AO polar comonomer are enchained with substantial activities in the absence of masking agents, ii. Substantial tacticities (up to 91.9% mmmm and 81.0% rrrr, respectively) are achieved, frequently exceeding those in the corresponding homopolymerizations, iii. AO incorporation levels first increase with increasing AO concentrations, but are ultimately suppressed at higher [AO], iv. AO deactivation effects are more severe for the FluZrMe$_2$-derived catalysts than for the SBIZrMe$_2$-derived catalysts.

Additional data and information relating to this Example may be found in the Appendix of U.S. Provisional Patent App. No. 62/943,384 filed on Dec. 4, 2019, the entire disclosure of which is incorporated by reference herein.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for forming polar-functionalized polypropylene, the method comprising contacting a propylene monomer and a polar monomer comprising an amine group in the presence of an organozirconium catalyst and in the absence of AlBu$^i_3$ and/or in the absence of methylaluminoxane, under conditions to induce a polymerization reaction between the propylene and polar monomers, thereby forming polar-functionalized polypropylene.

2. The method of claim 1, wherein the amine group has formula NR$_2$, wherein each R is an independently selected unsubstituted linear alkyl group or an unsubstituted branched alkyl group.

3. The method of claim 2, wherein each R is an independently selected unsubstituted linear alkyl group.

4. The method of claim 3, wherein the amine group has formula N(CH$_2$CH$_2$CH$_3$)$_2$.

5. The method of claim 1, wherein the amine group is covalently bound via a linear alkyl group having no more than 7 carbon atoms.

6. The method of claim 1, wherein the polar monomer has formula H$_2$C=CH(CH$_2$)$_n$NR$_2$, wherein each R is an independently selected unsubstituted linear alkyl group or an unsubstituted branched alkyl group and n is an integer from 1 to 11.

7. The method of claim 6, wherein each R is an independently selected unsubstituted linear alkyl group.

8. The method of claim 7, wherein the polar monomer has formula H$_2$C=CH(CH$_2$)$_n$N(CH$_2$CH$_2$CH$_3$)$_2$.

9. The method of claim 8, wherein n is from 1 to 7.

10. The method of claim 1, wherein the organozirconium catalyst is SBIZrMe$_2$ or FluZrMe$_2$.

11. The method of claim 10, wherein the polar monomer has formula $H_2C=CH(CH_2)_nN(CH_2CH_2CH_3)_2$.

12. The method of claim 11, wherein n is from 1 to 7.

13. The method of claim 7, wherein the polar-functionalized polypropylene exhibits a pentad isotacticity mmmm of at least 75% or a pentad syndiotacticity rrrr of at least 70%.

14. A method for forming polar-functionalized polypropylene, the method comprising contacting a propylene monomer and a polar monomer comprising an amine group in the presence of an organozirconium catalyst, under conditions to induce a polymerization reaction between the propylene and polar monomers, thereby forming polar-functionalized polypropylene, wherein the polar-functionalized polypropylene is syndiotactic.

15. The method of claim 14, wherein the polar-functionalized polypropylene exhibits a pentad syndiotacticity rrrr of at least 70%.

16. The method of claim 15, wherein the organozirconium catalyst is $FluZrMe_2$ and the polar monomer has formula $H_2C=CH(CH_2)_nNR_2$, wherein each R is an independently selected unsubstituted linear alkyl group and n is an integer from 1 to 11.

17. The method of claim 16, wherein the polar monomer has formula $H_2C=CH(CH_2)_nN(CH_2CH_2CH_3)_2$ and n is from 1 to 7.

18. The method of claim 1, wherein the contacting step is further conducted in the absence of any masking reagent capable of binding to the amine group of the polar monomer.

19. The method of claim 14, wherein the contacting step is conducted in the absence of $AlBu^i_3$ and in the absence of methylaluminoxane.

20. The method of claim 19, wherein the contacting step is further conducted in the absence of any masking reagent capable of binding to the amine group of the polar monomer.

21. The method of claim 1, wherein the organozirconium catalyst is $SBIZrMe_2$ and the polar monomer has formula $H_2C=CH(CH_2)_6N(CH_2CH_2CH_3)_2$.

\* \* \* \* \*